US006757393B1

(12) United States Patent
Spitzer et al.

(10) Patent No.: US 6,757,393 B1
(45) Date of Patent: Jun. 29, 2004

(54) WALL-HANGING ENTERTAINMENT SYSTEM

(76) Inventors: Marie L. Spitzer, 2509 Railroad Ave. SE., #5, Aberdeen, SD (US) 57401; John T. Morris, 1322 S. 5th St., Aberdeen, SD (US) 57401; Curt A. Wagner, P.O. Box 593, Ipswich, SD (US) 57457

( * ) Notice: Subject to any disclaimer, the term of this patent is extended or adjusted under 35 U.S.C. 154(b) by 441 days.

(21) Appl. No.: 09/705,636

(22) Filed: Nov. 3, 2000

(51) Int. Cl.7 .................................................. H04B 3/00

(52) U.S. Cl. .......................... 381/77; 40/124.3; 40/717

(58) Field of Search ............................ 381/152, 77, 87, 381/332, 300, 333, 306, 86, 386, 388; 40/455, 717, 124.03, 906; 434/169

(56) References Cited

U.S. PATENT DOCUMENTS

| | | | | |
|---|---|---|---|---|
| 4,072,314 A | | 2/1978 | Rosen et al. | |
| 4,541,188 A | | 9/1985 | Sadorus | |
| 4,923,032 A | | 5/1990 | Nuenberger | |
| 5,209,665 A | * | 5/1993 | Billings | 434/169 |
| 5,359,374 A | | 10/1994 | Schwartz | |
| 5,402,502 A | | 3/1995 | Boothroyd et al. | |
| 5,794,371 A | * | 8/1998 | Camillery | 40/717 |
| D402,985 S | | 12/1998 | Ho | |
| 5,864,627 A | | 1/1999 | Kim | |

* cited by examiner

*Primary Examiner*—Minsun Oh Harvey

(57) ABSTRACT

A wall-hanging entertainment system for conveniently providing an entertainment system while saving space in the user's home. The wall-hanging entertainment system includes a frame member being adapted to hang upon a wall structure and having an elongate top housing, an elongate bottom housing, and elongate side housings; and also includes a plurality of speakers being securely disposed in the housings; and further includes a radio assembly being disposed in one of the elongate side housings; and also includes a CD/cassette player assembly also being disposed in one of the elongate side housings.

13 Claims, 4 Drawing Sheets

WALL-HANGING ENTERTAINMENT SYSTEM

BACKGROUND OF THE INVENTION

1. Field of the Invention

The present invention relates to an am/fm disc player and more particularly pertains to a new wall-hanging entertainment system for conveniently providing an entertainment system while saving space in the user's home.

2. Description of the Prior Art

The use of an am/fm disc player is known in the prior art. More specifically, an am/fm disc player heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,359,374; U.S. Pat. No. 5,864,627; U.S. Pat. No. 4,923,032; U.S. Pat. No. 5,402,502; U.S. Pat. No. Des. 402,985; U.S. Pat. No. 4,541,188; and U.S. Pat. No. 4,072,314.

While these devices fulfill their respective, particular objectives and requirements, the aforementioned patents do not disclose a new wall-hanging entertainment system. The inventive device includes a frame member being adapted to hang upon a wall structure and having an elongate top housing, an elongate bottom housing, and elongate side housings; and also includes a plurality of speakers being securely disposed in the housings; and further includes a radio assembly being disposed in one of the elongate side housings; and also includes a CD/cassette player assembly also being disposed in one of the elongate side housings.

In these respects, the wall-hanging entertainment system according to the present invention substantially departs from the conventional concepts and designs of the prior art, and in so doing provides an apparatus primarily developed for the purpose of conveniently providing an entertainment system while saving space in the user's home.

SUMMARY OF THE INVENTION

In view of the foregoing disadvantages inherent in the known types of am/fm disc player now present in the prior art, the present invention provides a new wall-hanging entertainment system construction wherein the same can be utilized for conveniently providing an entertainment system while saving space in the user's home.

The general purpose of the present invention, which will be described subsequently in greater detail, is to provide a new wall-hanging entertainment system which has many of the advantages of the am/fm disc player mentioned heretofore and many novel features that result in a new wall-hanging entertainment system which is not anticipated, rendered obvious, suggested, or even implied by any of the prior art am/fm disc player, either alone or in any combination thereof.

To attain this, the present invention generally comprises a frame member being adapted to hang upon a wall structure and having an elongate top housing, an elongate bottom housing, and elongate side housings; and also includes a plurality of speakers being securely disposed in the housings; and further includes a radio assembly being disposed in one of the elongate side housings; and also includes a CD/cassette player assembly also being disposed in one of the elongate side housings.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wall-hanging entertainment system which has many of the advantages of the am/fm disc player mentioned heretofore and many novel features that result in a new wall-hanging entertainment system which is not anticipated, rendered obvious, suggested, or even implied by any of the prior art am/fm disc player, either alone or in any combination thereof.

It is another object of the present invention to provide a new wall-hanging entertainment system which may be easily and efficiently manufactured and marketed.

It is a further object of the present invention to provide a new wall-hanging entertainment system which is of a durable and reliable construction.

An even further object of the present invention is to provide a new wall-hanging entertainment system which is susceptible of a low cost of manufacture with regard to both materials and labor, and which accordingly is then susceptible of low prices of sale to the consuming public, thereby making such wall-hanging entertainment system economically available to the buying public.

Still yet another object of the present invention is to provide a new wall-hanging entertainment system which provides in the apparatuses and methods of the prior art some of the advantages thereof, while simultaneously overcoming some of the disadvantages normally associated therewith.

Still another object of the present invention is to provide a new wall-hanging entertainment system for conveniently providing an entertainment system while saving space in the user's home.

Yet another object of the present invention is to provide a new wall-hanging entertainment system which includes a frame member being adapted to hang upon a wall structure and having an elongate top housing, an elongate bottom housing, and elongate side housings; and also includes a plurality of speakers being securely disposed in the housings; and further includes a radio assembly being disposed in one of the elongate side housings; and also includes a CD/cassette player assembly also being disposed in one of the elongate side housings.

Still yet another object of the present invention is to provide a new wall-hanging entertainment system that combines an entertainment system with a picture/mirror/bulletin board.

Even still another object of the present invention is to provide a new wall-hanging entertainment system that is easy to mount to any wall structure in a building.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
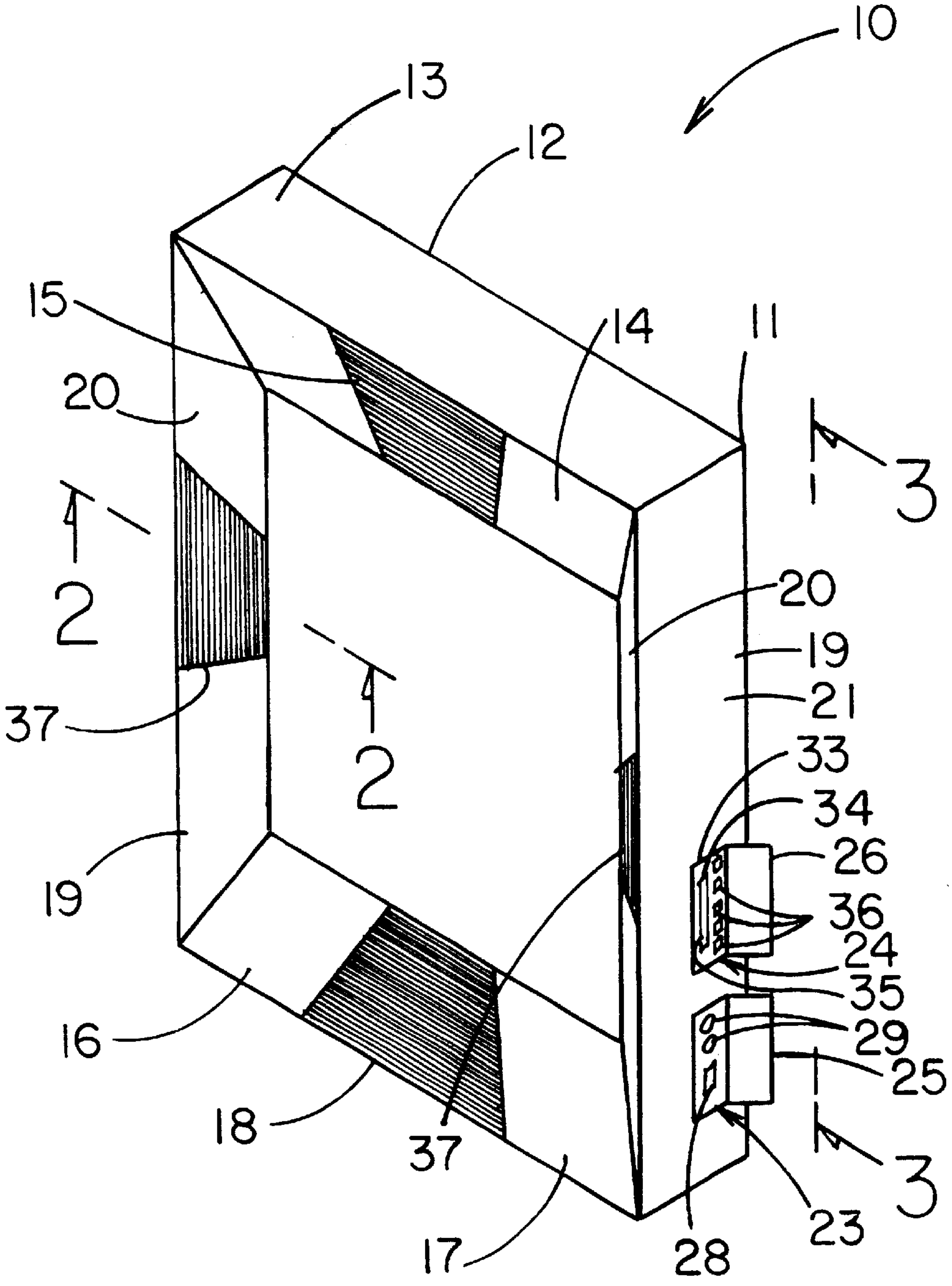
FIG. 1 is a perspective view of a new wall-hanging entertainment system according to the present invention.
Figure 2:
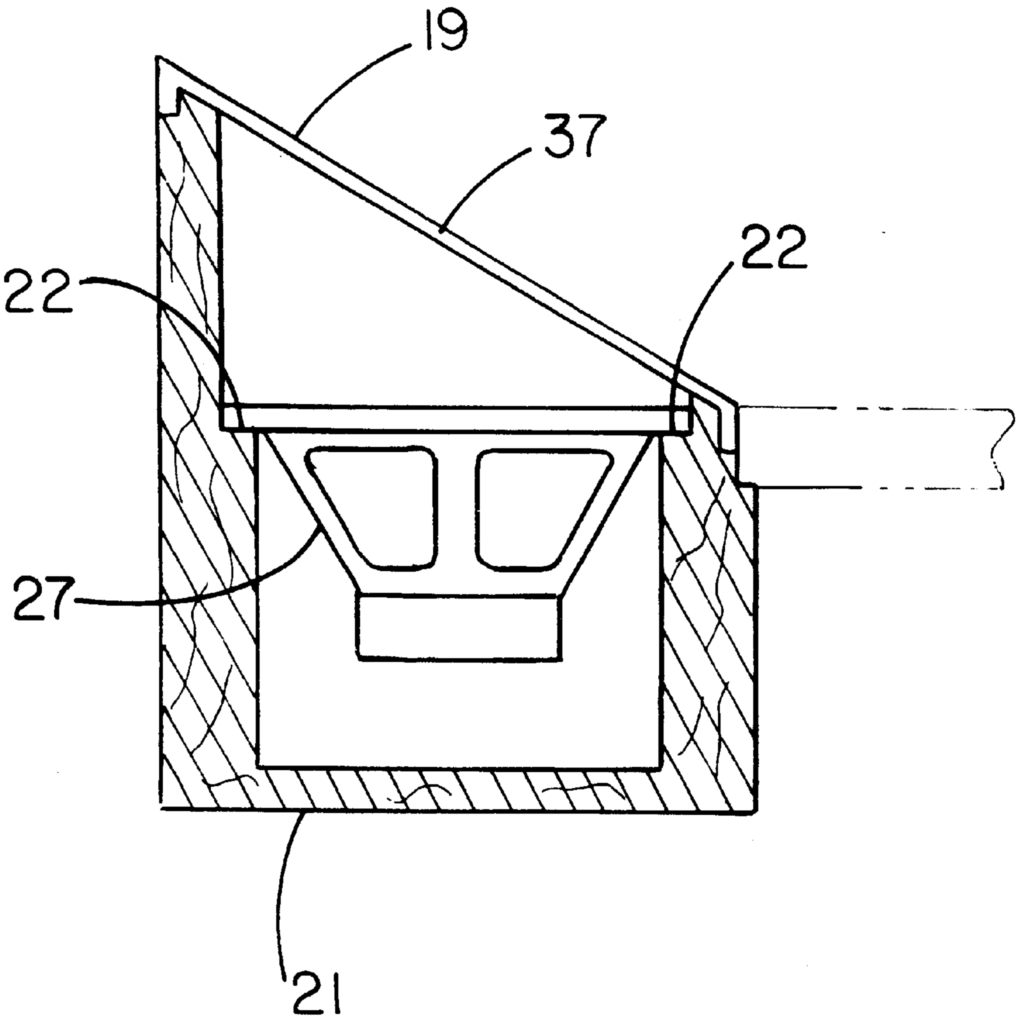
FIG. 2 is a cross-sectional view of the present invention.
Figure 3:
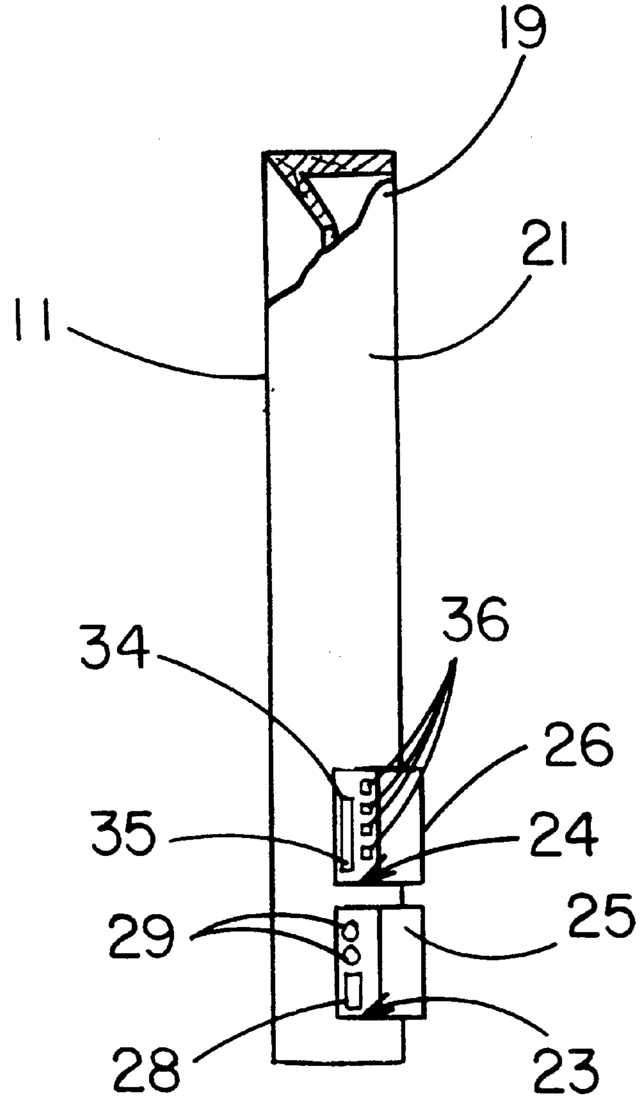
FIG. 3 is a side elevational view of the present invention.
Figure 4:
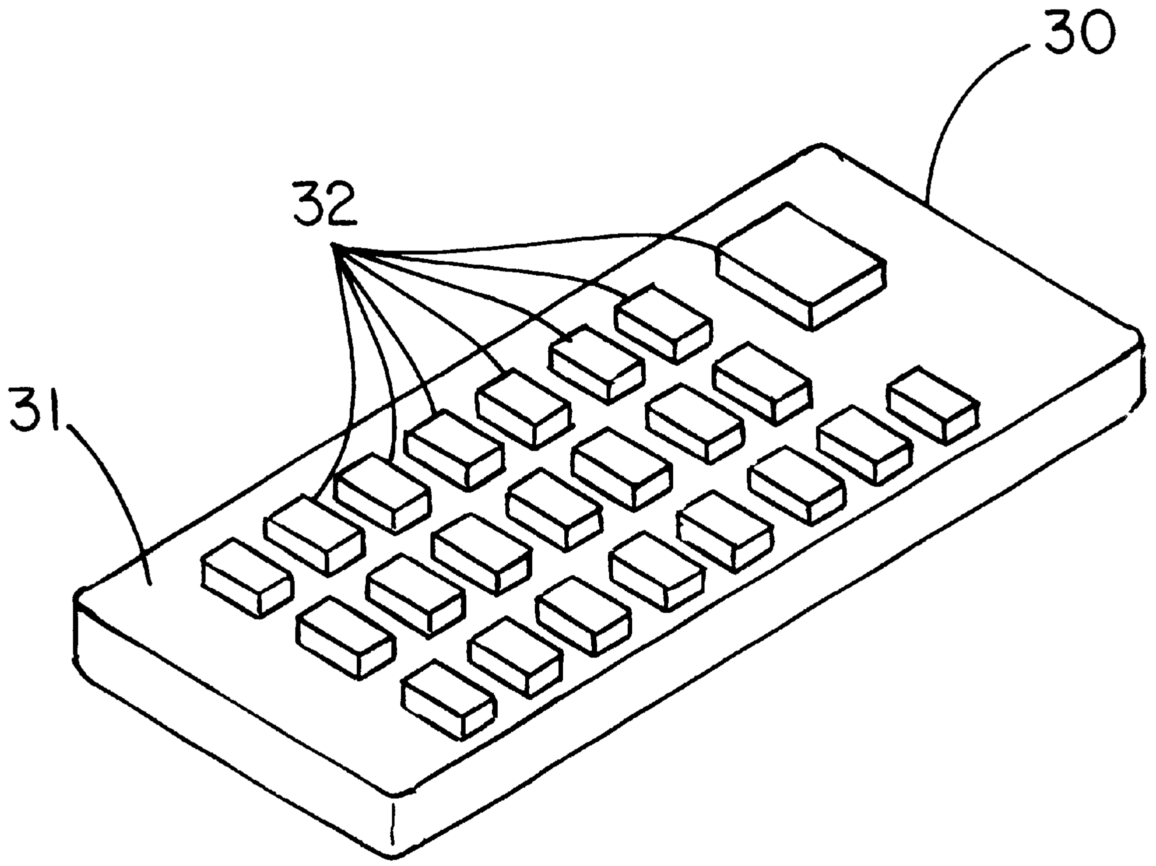
FIG. 4 is a perspective view of a remote control of the present invention.

With reference now to the drawings, and in particular to FIGS. 1 through 4 thereof, a new wall-hanging entertainment system embodying the principles and concepts of the present invention and generally designated by the reference numeral 10 will be described.

As best illustrated in FIGS. 1 through 4, the wall-hanging entertainment system 10 generally comprises a frame member 11 being adapted to hang upon a wall structure and having an elongate top housing 12, an elongate bottom housing 16, and elongate side housings 19. Each of the housings 12,16,19 includes an outer side wall 13,21, a back wall 38, and a slanted inner side wall 14,17,20 which faces generally inwardly of the frame member 11. Each of the slanted inner walls 14,17,20 includes a louvered speaker port 15,18,37 being conventionally disposed therein and being disposed intermediate of ends of the slanted inner wall 14,17,20. Each of the housings 12,16,19 further includes a ledge 22 being conventionally disposed inside thereof. One of the elongate side housings 19 has recessed portions 23,24 being disposed in the outer side wall 21 thereof. The frame member 11 also includes cover members 25,26 being securely and conventionally attached along the recessed portions 23,24 and being adapted to removably cover the recessed portions 23,24.

A plurality of speakers 27 are securely and conventionally disposed in the housings 12,16,19. Each of the speakers 27 has a perimeter which is securely supported upon the ledge 22 of a respective housing 12,16,19.

A radio assembly is disposed in one of the elongate side housings 19. The radio assembly includes a radio receiver 28 being securely and conventionally disposed in one of the elongate side housings 19, and also includes radio control members 29 being conventionally disposed in one of the recessed portions 23 of the elongate side housing 19, and further includes a remote control unit 30 having a housing member 31 and a plurality of keys 32 being conventionally disposed in and upon the housing member 31 for operating the radio receiver 28.

A CD/cassette player assembly is also disposed in one of the elongate side housings 19. The CD/cassette player assembly includes a CD/cassette player member 33 being conventionally disposed in one of the elongate side housings 19 and having a slot 34 and a tray 35 which is disposed in another of the recessed portions 24 and also includes control members 36 being conventionally disposed in the recessed portion 24, and further includes the remote control unit 30 for operating the CD/cassette player member 34.

In use, the user hangs the frame member 11 upon a desired wall structure and can operated either the radio receiver 28 or the CD/cassette player member 33 with the remote control unit 30.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A wall-hanging entertainment system comprising:

a frame member being adapted to hang upon a wall structure and having an elongate top housing, an elongate bottom housing, and elongate side housings;

a plurality of speakers being securely disposed in said elongate top housing, said elongate bottom housing and said elongate side housing;

a radio assembly being disposed in one of said elongate side housings;

a CD/cassette player assembly also being disposed in one of said elongate side housings;

wherein each of said housings includes an outer side wall, a back wall, and a slanted inner side wall which faces generally inwardly of said frame member;

wherein each of said slanted inner walls include a louvered speaker port being disposed therein and being disposed intermediate of ends of said slanted inner wall;

wherein each of said elongate top housing, said elongate bottom housing and said elongate side housing;

further includes a ledge disposed inside thereof; and wherein one of said elongate side housings has recessed portions disposed in said outer side wall thereof.

2. A wall-hanging entertainment system as described in claim 1, wherein said frame member also includes cover members being securely attached along said recessed portions and being adapted to removably cover said recessed portions.

3. A wall-hanging entertainment system as described in claim 2, wherein each of said speakers has a perimeter which is securely supported upon said ledge of a respective said housing.

4. A wall-hanging entertainment system as described in claim 3, wherein said radio assembly includes a radio receiver being securely disposed in one of said elongate side housings, and also includes radio control members being disposed in one of said recessed portions of said elongate side housing, and further includes a remote control unit having a housing member and a plurality of keys being disposed in and upon said housing member for operating said radio receiver.

5. A wall-hanging entertainment system as described in claim 4, wherein said CD/cassette player assembly includes a CD/cassette player member being disposed in one of said elongate side housings having a slot and a tray which is disposed in another of said recessed portions and also including control members being disposed in said another of said recessed portions and further including said remote control unit for operating said CD/cassette player member.

6. A wall-hanging entertainment system comprising:

a frame member being adapted to hang upon a wall structure and having an elongate top housing, an elongate bottom housing, and elongate side housings, each of said housings including an outer side wall, a back wall, and a slanted inner side wall which faces generally inwardly of said frame member, each of said slanted inner walls including a louvered speaker port being disposed therein and being disposed intermediate of ends of said slanted inner wall, each of said housings further including a ledge disposed inside thereof, one of said elongate side housings having recessed portions disposed in said outer side wall thereof, said frame member also including cover members being securely attached along said recessed portions and being adapted to removably cover said recessed portions;

a plurality of speakers being securely disposed in said housings, each of said speakers having a perimeter which is securely supported upon said ledge of a respective said elongate top housing, said elongate bottom housing and said elongate side housing;

a radio assembly being disposed in one of said elongate side housings, said radio assembly including a radio receiver being securely disposed in one of said elongate side housings, and also including radio control members being disposed in one of said recessed portions of said elongate side housing, and further including a remote control unit having a housing member and a plurality of keys being disposed in and upon said housing member for operating said radio receiver; and a CD/cassette player assembly also being disposed in one of said elongate side housings, said CD/cassette player assembly including a CD/cassette player member being disposed in one of said elongate side housings having a slot and a tray which is disposed in another of said recessed portions and also including control members being disposed in said another of said recessed portions, and further including said remote control unit for operating said CD/cassette player member.

7. A wall-hanging entertainment system comprising:

a frame member being adapted to hang upon a wall structure and having an elongate top housing, an elongate bottom housing, and elongate side housings;

a plurality of speakers being securely disposed in said elongate top housing, said elongate bottom housing and said elongate side housing;

a radio assembly being disposed in one of said elongate side housings;

a CD/cassette player assembly also being disposed in one of said elongate side housings;

wherein each of said housings includes an outer side wall, a back wall, and a slanted inner side wall which faces generally inwardly of said frame member; and wherein one of said elongate side housings has recessed portions disposed in said outer side wall thereof.

8. A wall-hanging entertainment system as described in claim 7, wherein each of said slanted inner walls include a louvered speaker port being disposed therein and being disposed intermediate of ends of said slanted inner wall.

9. A wall-hanging entertainment system as described in claim 7, wherein each of said elongate top housing, said elongate bottom housing and said elongate side housing;

further includes a ledge disposed inside thereof.

10. A wall-hanging entertainment system as described in claim 9, wherein each of said speakers has a perimeter which is securely supported upon said ledge of a respective said housing.

11. A wall-hanging entertainment system as described in claim 7, wherein said frame member also includes cover members being securely attached along said recessed portions and being adapted to removably cover said recessed portions.

12. A wall-hanging entertainment system as described in claim 7, wherein said radio assembly includes a radio receiver being securely disposed in one of said elongate side housings, and also includes radio control members being disposed in one of said recessed portions of said elongate side housing, and further includes a remote control unit having a housing member and a plurality of keys being disposed in and upon said housing member for operating said radio receiver.

13. A wall-hanging entertainment system as described in claim 12, wherein said CD/cassette player assembly includes a CD/cassette player member being disposed in one of said elongate side housings having a slot and a tray which is disposed in another of said recessed portions and also including control members being disposed in said another of said recessed portions and further including said remote control unit for operating said CD/cassette player member.

* * * * *